Dec. 3, 1929.   N. T. HIESTER   1,737,587
AIR FILTER
Filed Aug. 24, 1927
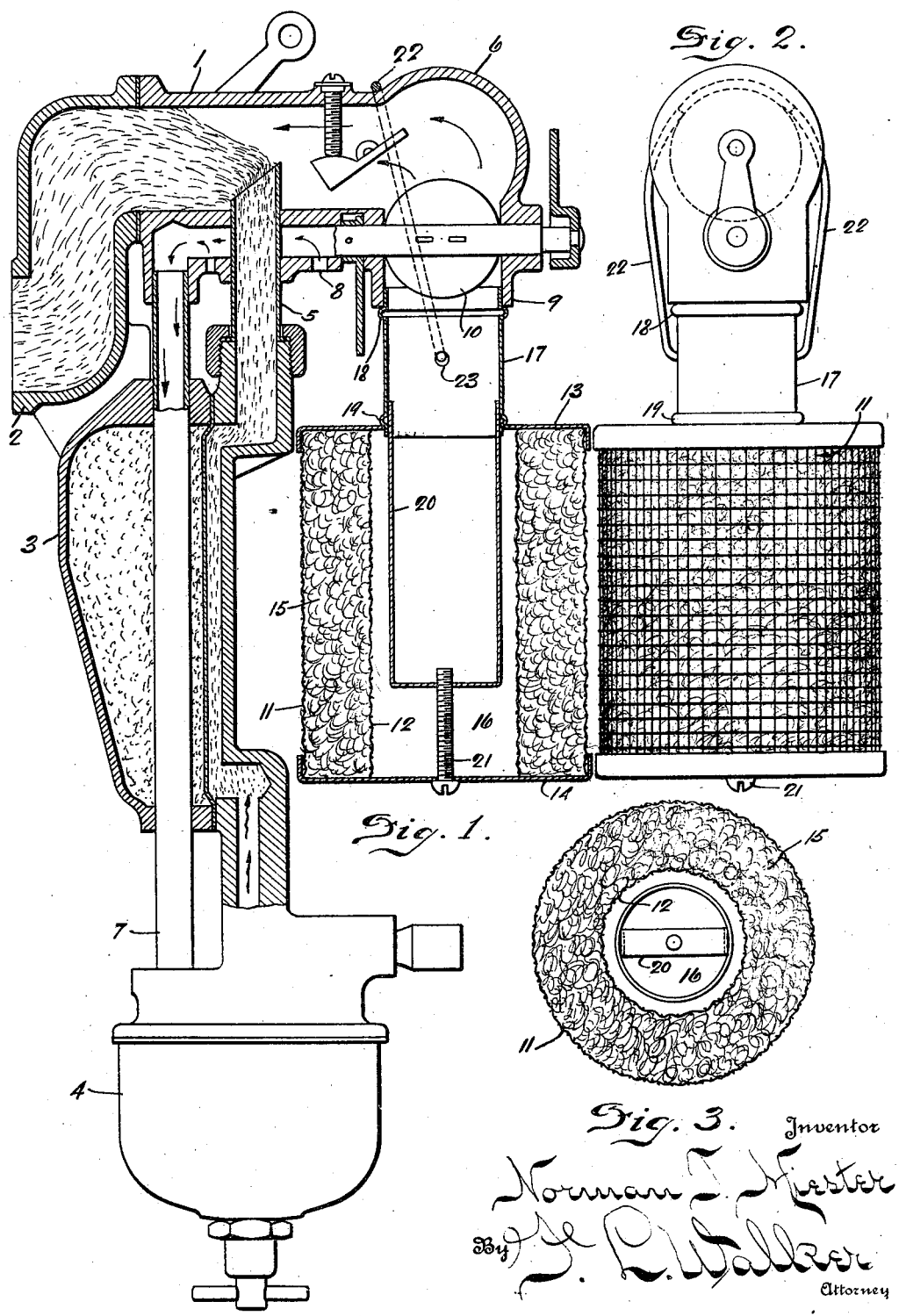

Patented Dec. 3, 1929

1,737,587

UNITED STATES PATENT OFFICE

NORMAN T. HIESTER, OF DAYTON, OHIO

AIR FILTER

Application filed August 24, 1927. Serial No. 215,231.

My invention relates to explosive engines, and more particularly to an air filter for straining the air and removing dust therefrom, prior to its introduction into the carburetor or into the intake manifold of the engine as the case may be. The present filter construction, although illustrated in connection with a vaporizer, is equally applicable to the air intake port of the usual carburetor.

The preferred form of air filter, as herein illustrated, comprises a hollow, cylindrical body having rather thick porous walls formed by two concentric screen cages between which is interposed a packing of fibrous material, such as upholstering hair, cotton, jute, asbestos, or other material capable of permitting the passage of air therethrough but adapted to intercept dust and dirt particles which may be carried by the air currents. Such body is provided at one end with a tubular neck communicating with the interior of the hollow filter unit and connecting at its opposite end with the air intake port of a carburetor or fuel vaporizer, or the like. The area of the filter walls of the unit is very much greater than the area of the air intake port to which the filter is connected thereby insuring a free flow of air under the influence of engine suction even after long periods of use during which the filter body may be partially clogged by collected dust and dirt.

The object of the invention is to simplify the structure, as well as the means and mode of operation of such air filters whereby they will not only be cheapened in construction, but will be more efficient in operation, uniform in action, of increased capacity, capable of long periods of use without the necessity for cleaning, and unlikely to get out of repair.

A further object of the invention is to provide an improved form of tubular filter bodies and to provide a support therefor which will prevent disarrangement or distortion of the filter body by vibration incident to its use upon an automobile.

With the above primary and other incidental objects in view, as will more fully appear in the specification, the invention consists of the features of construction, the parts and combinations thereof, and the mode of operation, or their equivalents, as hereinafter described and set forth in the claims.

Referring to the accompanying drawings wherein is shown the preferred but obviously not necessarily the only form of embodiment of the invention, Fig. 1 is a sectional view of the air filter forming the subject matter hereof applied to a fuel vaporizer with which is connected the carburetor and forming the fuel supply system of a motor vehicle engine. Fig. 2 is a side elevation of the air filter. Fig. 3 is a bottom plan view of the assembled filter with the lower head removed.

In the accompanying drawings, 1 indicates the intake manifold of an explosive engine, of which 2 is the exhaust conduit. This exhaust conduit is provided at one side with a chamber 3 connected at its lower end with a carburetor 4. At its upper end this chamber communicates through a conduit 5 with the vaporizer 6. Air is supplied to the carburetor 4 through a conduit 7 communicating through the vaporizer 6 with the air inlet port 8. The vaporizer 6 is provided with an air inlet port 9 controlled by a butterfly or damper valve 10. Ordinarily this inlet port 9 is open to atmosphere and freely admits dust or dirt which may be carried into the vaporizer 6 and thence into the engine with the incoming current of air. The construction thus far described forms no part of the present invention but is shown and described merely as a typical installation with which the present air filter is to be associated. It will be understood, however, that the air filter forming the subject matter hereof is not limited to use with such hot plate type of vaporizer, but may be applied directly to the intake port of the ordinary carburetor as employed at the present time on motor vehicles.

The air filter comprises two concentric spaced screen wire cages 11 and 12, provided at their opposite ends with imperforate heads 13 and 14. Interposed between the screen wire cylinders or cages 11 and 12 is a body 15 of filter material. This filter body 15 is preferably a body of matted hair, such as is used for upholstering purposes. However, other porous or fibrous material may be substituted for the body of hair. This filter body 15 forms a cylindrical wall of considerable thickness, enclosing therein a chamber 16. The screen wire cylinders 11 and 12 are held in position and the body 15 of filter material confined therebetween by being clamped between the opposite heads 13 and 14. The upper head 13 is provided with a central opening to receive one end of a tubular neck 17, the opposite end of which is insertable within the air inlet port 9 of the vaporizer, or carburetor as the case may be. This tubular neck 17 is shouldered as at 18 and 19 to limit its insertion within the opening of the head 13 and the port 9 of the vaporizer. Electrically welded or otherwise attached to the tubular neck 17 is a dependent stirrup 20 extending within the chamber 16 of the filter. The lower head 14 is centrally perforated to receive a screw 21 which engages with the dependent stirrup 20 to draw the assembled parts together. The peripheral flange or shoulder 19 of the tubular neck 17 bearing up on the head 13 at one end of the unit and the screw 21 engaging the opposite end of the unit serve to clamp the filter body 15 and its confining cylindrical screen walls 11 and 12 therebetween. The filter unit is supported upon the vaporizer 6 or upon the carburetor by hook arms 22, preferably of spring wire. The lower ends of these arms are inturned for engagement in suitably positioned holes 23 in the side wall of the tubular neck 17, while the upper ends are bent to arcuate form to engage in overlapping relation with the vaporizer 6. The filter unit is preferably, though not necessarily, dipped in a light oil which materially increases the attraction of the filter body for particles of dust and effects their adherence thereto. The surface area of a cylindrical filter body 15 is very much greater than the cross sectional area of the tubular neck 17 or inlet port 9 of the vaporizer. Consequently only a small portion of such area is necessary to supply the required quantity of air. Initially the air will be supplied through the first or topmost zone of the cylindrical filter wall. As such portion of the wall becomes clogged or more or less obstructed by the accumulation of dust and dirt the air supply will be drawn through a gradually descending zone until the bottom of the unit is reached. Thus the device may be continued in operation for a long period of time before cleansing or rejuvenation becomes necessary. This is easily and quickly effected by immersing the unit in gasoline which washes the dust and dirt accumulation therefrom after which it is again dipped in a light oil preparatory to another extended period of usefulness.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features it is to be understood that the invention is not limited to the specific details shown, but that the means and construction herein disclosed comprises the preferred form of several modes of putting the invention into effect, and the invention is, therefore, claimed in any of its forms or modifications within the legitimate and valid scope of the appended claims.

Having thus described my invention, I claim:

1. An air filter of the character described, including two circular spaced heads, marginal flanges projecting from the inner faces of said heads, one of the heads having a concentric opening therein, a pair of concentric perforate cylinders interposed between the heads, the ends of the outer cylinder being enclosed within the marginal flanges of the heads, a tubular neck portion having peripheral beads in spaced relation with its ends, one end of the neck being extended into the opening of said open head the extent of insertion being limited by one of said peripheral beads, the other end of the neck portion being for insertion in the orifice of an air conduit to the limit defined by the other peripheral bead, said neck and opening in the head being of somewhat less dimension than the inner perforate cylinder, a U-shaped stirrup attached to the neck portion and extending within the inner cylinder, means for detachably engaging the stirrup with the head at the end of the structure opposite the neck, attachment means carried by the neck portion and adapted to engage the air intake conduit, and a body of fibrous filter material interposed between the cylinders.

2. An air filter of the character described including a cylindrical hollow filter body, means for retaining the body in its cylindrical hollow form, terminal marginally flanged heads for said body having their flanges inturned toward each other and overlapping the cylindrical body, one of the heads having therein a concentric opening, a tubular neck portion communicating with the interior of the filter body through said opening, tie means interconnecting the respective heads, the filter body and tubular neck into a unitary structure, and oppositely disposed hook arms carried by the structure and adapted to engage over an air intake conduit with which the neck portion communicates.

In testimony whereof, I have hereunto set my hand this 9th day of August, A. D. 1927.

NORMAN T. HIESTER.